(12) United States Patent
Nelson et al.

(10) Patent No.: US 11,885,450 B2
(45) Date of Patent: Jan. 30, 2024

(54) QUICK CONNECT COUPLER

(71) Applicant: NELSON IRRIGATION CORPORATION, Walla Walla, WA (US)

(72) Inventors: Craig B. Nelson, Walla Walla, WA (US); Chad D. Leinweber, Walla Walla, WA (US); Mathew L. Zimmerman, Walla Walla, WA (US)

(73) Assignee: NELSON IRRIGATION CORPORATION, Walla Walla, WA (US)

( * ) Notice: Subject to any disclaimer, the term of this patent is extended or adjusted under 35 U.S.C. 154(b) by 273 days.

(21) Appl. No.: 17/181,620

(22) Filed: Feb. 22, 2021

(65) Prior Publication Data
US 2022/0268385 A1 Aug. 25, 2022

(51) Int. Cl.
*F16L 37/252* (2006.01)
*B05B 15/65* (2018.01)

(52) U.S. Cl.
CPC ............ *F16L 37/252* (2013.01); *B05B 15/65* (2018.02)

(58) Field of Classification Search
CPC ............................... F16L 37/252; B05B 15/65
USPC ............... 239/275, 279, 280; 285/21.1, 21.2, 285/24–29, 31, 35, 80, 305, 307, 314, 285/315, 396, 401, 402
See application file for complete search history.

(56) References Cited

U.S. PATENT DOCUMENTS

| | | | |
|---|---|---|---|
| 1,493,221 | A | 5/1924 | Northrup |
| 2,256,845 | A | 9/1941 | Ludwig |
| 2,996,318 | A | 8/1961 | Gravert |
| 3,141,686 | A | 7/1964 | Smith |
| 3,578,362 | A | 5/1971 | Cauthery |
| 3,625,548 | A | 12/1971 | Boehm |
| 3,957,292 | A | 5/1976 | Diggs |
| 3,966,233 | A | 6/1976 | Diggs |
| 3,971,573 | A | 7/1976 | Clements |
| 3,973,732 | A | 8/1976 | Diggs |
| 4,017,958 | A | 4/1977 | Diggs |
| 4,135,738 | A | 1/1979 | Clements |

(Continued)

FOREIGN PATENT DOCUMENTS

| | | |
|---|---|---|
| CN | 2184620 Y | 12/1994 |
| CN | 203752007 U | 8/2014 |

(Continued)

OTHER PUBLICATIONS

Chinese Office Action dated Oct. 10, 2020 issued in Chinese Patent Application No. 201910287934.0 and English translation, 23 pp.

*Primary Examiner* — Christopher S Kim
(74) *Attorney, Agent, or Firm* — NIXON & VANDERHYE P.C.

(57) ABSTRACT

A quick connect coupler includes a female connector having a central bore and a plurality of recesses, and a male connector having a post insertable into the central bore. The male connector has a first tab row with a plurality of first tabs and a second tab row with a plurality of second tabs axially spaced from the plurality of first tabs. The first and second tabs are shaped corresponding to the recesses in the female connector. The first and second tab rows are circumferentially offset to effect a two- or multi-step connection between the female connector and the male connector.

17 Claims, 10 Drawing Sheets

(56) References Cited

U.S. PATENT DOCUMENTS

| | | | |
|---|---|---|---|
| 4,211,439 A * | 7/1980 | Moldestad | F16L 37/113 |
| | | | 285/376 |
| 4,278,279 A | 7/1981 | Zimmerman | |
| 4,637,641 A | 1/1987 | Kennedy, Jr. | |
| 5,947,386 A | 9/1999 | Dick et al. | |
| 6,116,527 A | 9/2000 | Granger et al. | |
| 6,682,106 B2 | 1/2004 | Parker | |
| 8,573,509 B2 | 11/2013 | Cole | |
| 9,592,518 B2 | 3/2017 | Drechsel | |
| 9,877,439 B1 | 1/2018 | McHugh | |
| 10,774,967 B1 | 9/2020 | Corzo | |
| 2003/0075923 A1 * | 4/2003 | Lepoutre | F02M 35/10144 |
| | | | 285/914 |
| 2011/0176865 A1 | 7/2011 | Colby | |
| 2013/0256427 A1 | 10/2013 | Steingass et al. | |
| 2019/0145565 A1 | 5/2019 | Furcoiu | |

FOREIGN PATENT DOCUMENTS

| | | |
|---|---|---|
| CN | 203847875 U | 9/2014 |
| CN | 203993746 U | 12/2014 |
| CN | 206468955 U | 9/2017 |
| CN | 210545938 U | 5/2020 |

\* cited by examiner

QUICK CONNECT COUPLER

CROSS-REFERENCES TO RELATED APPLICATIONS (NOT APPLICABLE)

STATEMENT REGARDING FEDERALLY SPONSORED RESEARCH OR DEVELOPMENT (NOT APPLICABLE)

BACKGROUND

The invention relates to a quick connect coupler and, more particularly, to a quick connect coupler incorporating axially spaced and circumferentially offset connection components to effect a multi-step connection between a female connector and a male connector.

Industrial sprinklers are typically coupled with high volume, high pressure water sources. Existing quick connect coupler mechanisms between the sprinkler and the water source have the potential to be disconnected while the sprinkler is under pressure. This disconnection could cause the components to blow apart, creating a potentially dangerous situation for the irrigator.

SUMMARY

The coupler according to the described embodiments provides for a multi-stage engagement, wherein if the coupler is disengaged under pressure, the coupler includes structure to prevent the connection from blowing apart due to the pressure from the water. In the event of a disconnection, a female connector will be displaced upward into engagement with an adjacent tab row and begin to vent water. The venting of water will alert the irrigator that the coupler is not properly secured while preventing the sprinkler from being launched into the air and potentially injuring the irrigator.

The coupler of the described embodiments includes a male connector and a female connector. A seal may be provided between the male and female connectors. The female connector may have a groove that holds the seal along with a plurality of recesses that allow for it to only assemble one way onto the male connector. The male connector has two rows of tabs through which the female connector is displaced to ensure a proper connection.

In an exemplary embodiment, a coupler includes a female connector having a central bore and a plurality of recesses, and a male connector having a post insertable into the central bore. The male connector includes a first tab row with a plurality of first tabs and a second tab row with a plurality of second tabs axially spaced from the plurality of first tabs. The first and second tabs are shaped corresponding to the recesses in the female connector. The first and second tab rows are circumferentially offset to effect a two-step connection between the female connector and the male connector.

The coupler may further include a radial stop member connected between the first tab row and the second tab row, where one of the plurality of recesses engages the radial stop member when the plurality of recesses are aligned with the second tab row. The plurality of recesses may be differently sized, and the pluralities of first and second tabs may be correspondingly differently sized. In some embodiments, the different sizes effect the female connector being engageable with the male connector in only one orientation.

The coupler may further include a seal positioned between the female connector and the male connector, where the seal is active when the plurality of recesses are displaced past the second tab row and the female connector is fully seated on the male connector. The female connector may include a seal groove, and the seal may be secured in the seal groove.

The female connector may include a first pin tab, and the male connector may include a second pin tab. In this context, one of the first and second pin tabs may include a stop arm, and when the plurality of recesses are displaced past the second tab row, the female connector may be rotatable on the male connector until the stop arm engages the other of the first and second pin tabs. The first and second pin tabs may each include an aperture therein, where the apertures are aligned when the stop arm engages the other of the first and second pin tabs.

The female connector may be rotatable relative to the male connector to align the plurality of recesses with the pluralities of first and second tabs such that female connector is connectable to the male connector in a four-step process including: (1) positioning the plurality of recesses over the plurality of first tabs in the first tab row, (2) rotating the female connector relative to the male connector to align the plurality of recesses with the plurality of second tabs in the second tab row, (3) positioning the plurality of recesses over the plurality of second tabs in the second tab row, and (4) rotating the female connector relative to the male connector until the female connector is fully seated on the male connector.

In another exemplary embodiment, a sprinkler assembly includes a sprinkler and the coupler of the described embodiments, where the female connector is secured to the sprinkler, and the male connector is secured to a source of water under pressure.

In another exemplary embodiment, a coupler includes a female connector having a central bore and a plurality of recesses, where at least two of the plurality of recesses are differently sized, and a male connector having a post insertable into the central bore. The male connector includes a first tab row with a plurality of first tabs and a second tab row with a plurality of second tabs axially spaced from the plurality of first tabs. The first and second tabs are shaped corresponding to the recesses in the female connector. A radial stop member is connected between the first tab row and the second tab row, where one of the plurality of recesses engages the radial stop member when the plurality of recesses are aligned with the second tab row.

In yet another exemplary embodiment, a method of securing the coupler of the described embodiments includes the steps of (a) positioning the plurality of recesses over the plurality of first tabs in the first tab row; (b) rotating the female connector relative to the male connector to align the plurality of recesses with the plurality of second tabs in the second tab row; (c) displacing the plurality of recesses over the plurality of second tabs in the second tab row; and (d) rotating the female connector relative to the male connector until the female connector is fully seated on the male connector.

Step (a) may be practiced by displacing the plurality of recesses over the plurality of first tabs until the female connector engages the second tab row.

In some embodiments, the female connector includes a first pin tab and the male connector includes a second pin tab, where one of the first and second pin tabs has a stop arm.

Step (d) may be practiced by rotating the female connector relative to the male connector until the stop arm engages the other of the first and second pin tabs.

BRIEF DESCRIPTION OF THE DRAWINGS

These and other aspects and advantages will be described in detail with reference to the accompanying drawings, in which.

DETAILED DESCRIPTION

Figure 1:
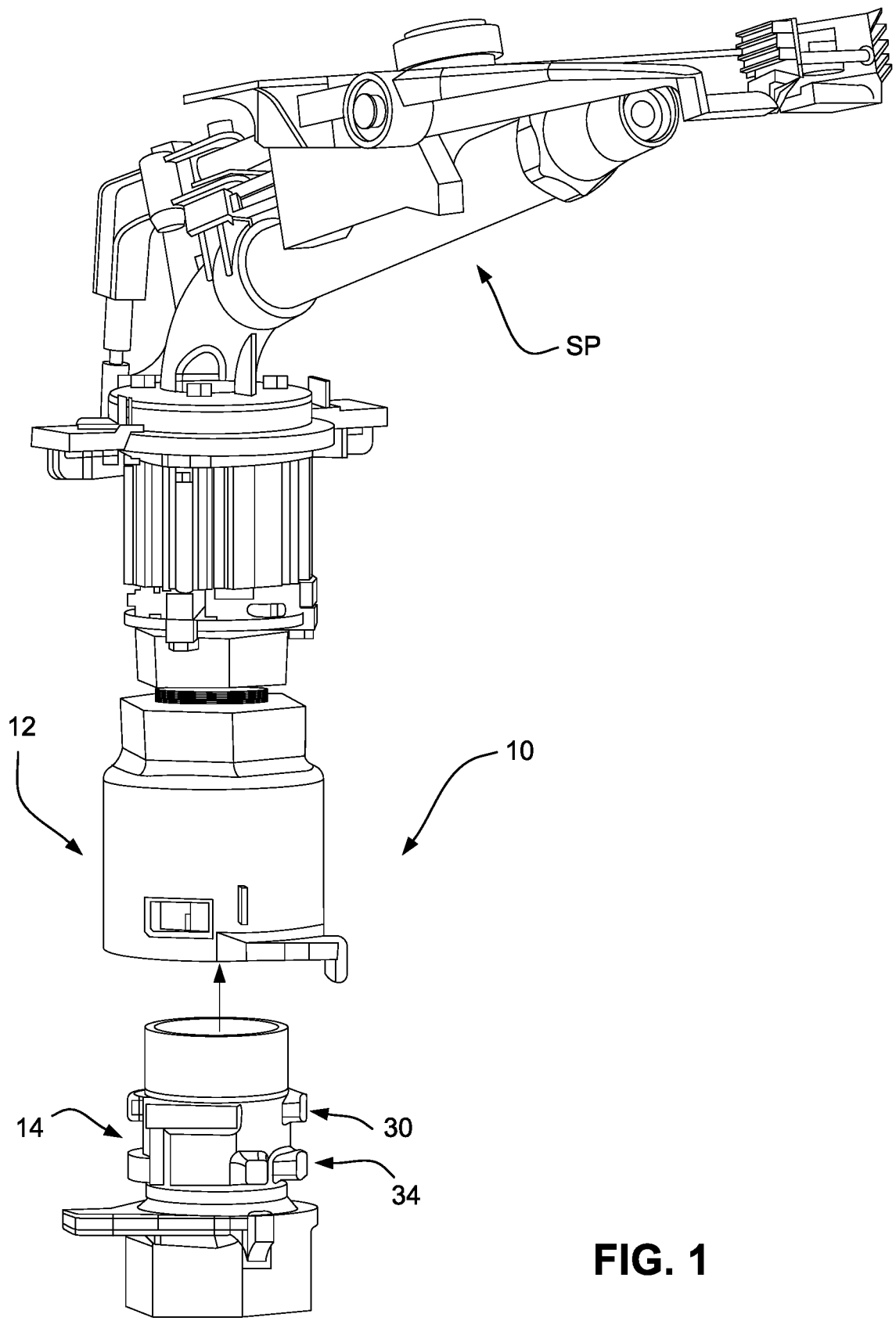
FIG. 1 shows a sprinkler assembly and the quick connect coupler of the described embodiments in a disconnected state.
Figure 2:
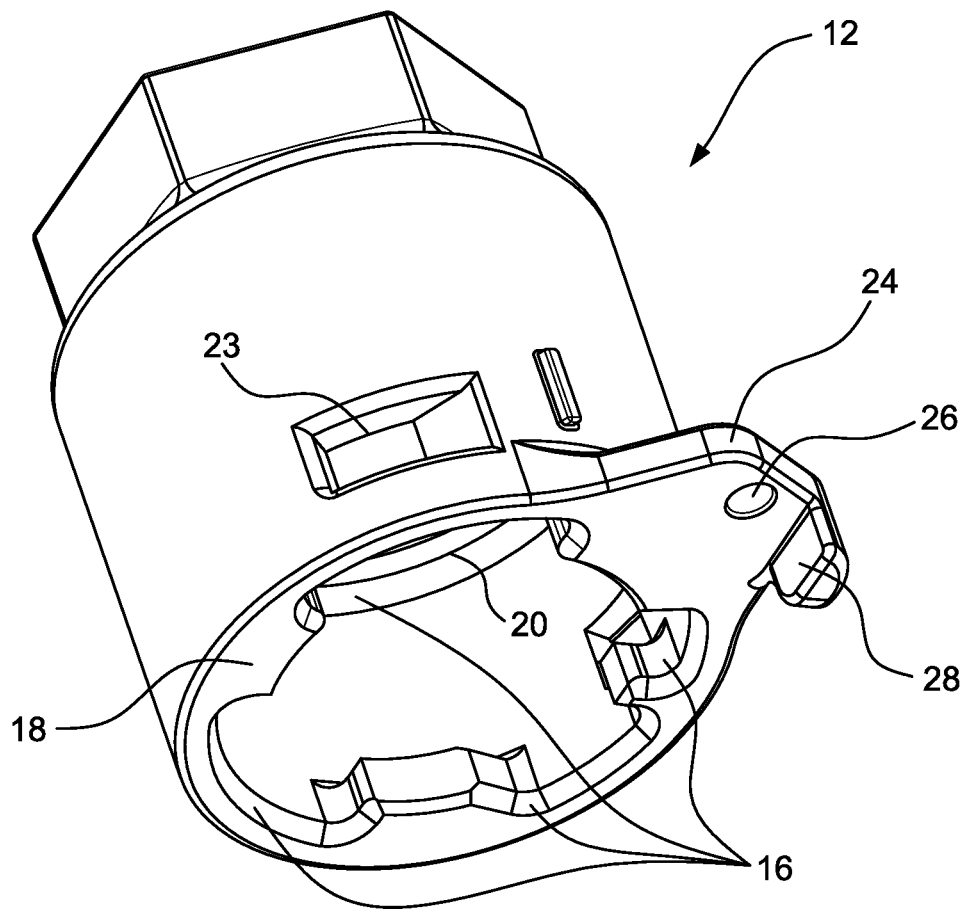
FIG. 2 is a perspective view of the female connector.
Figure 3:
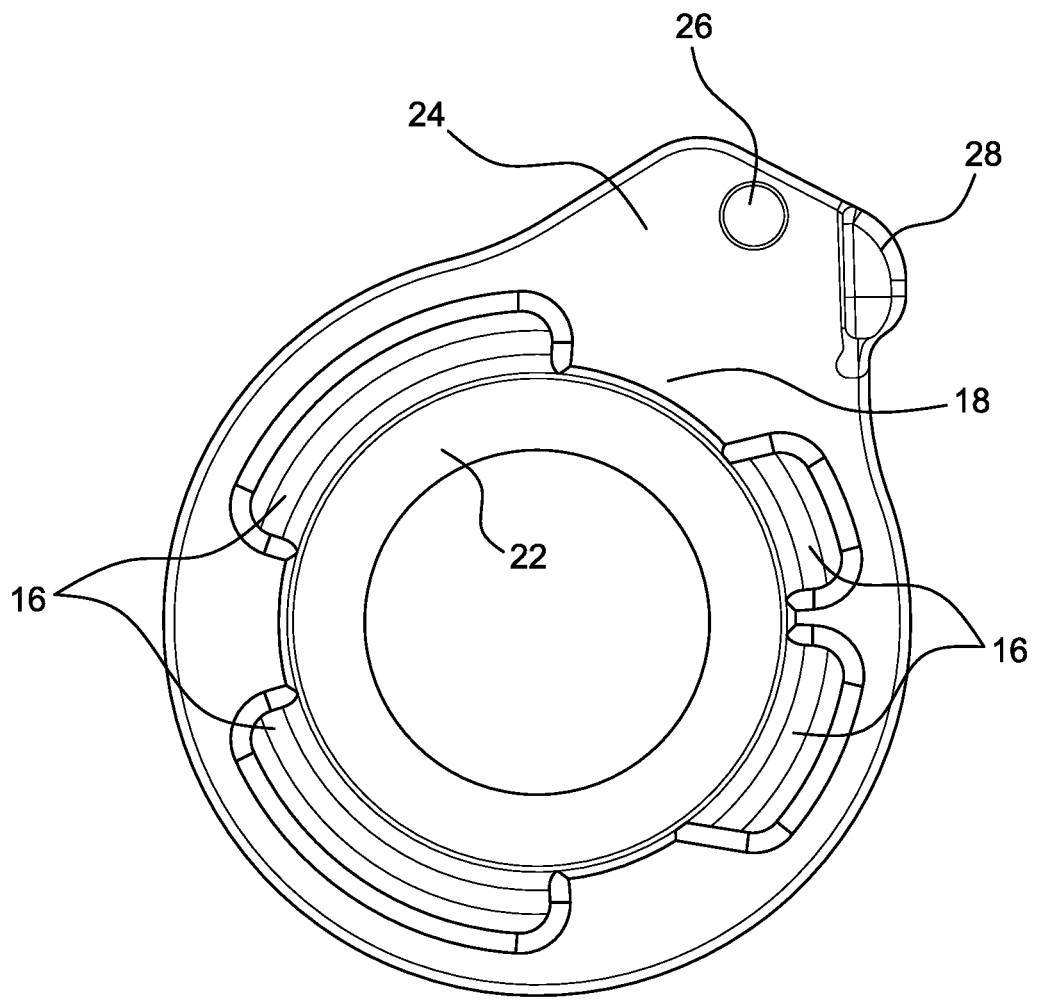
FIG. 3 is a bottom view of the female connector.
Figure 7:
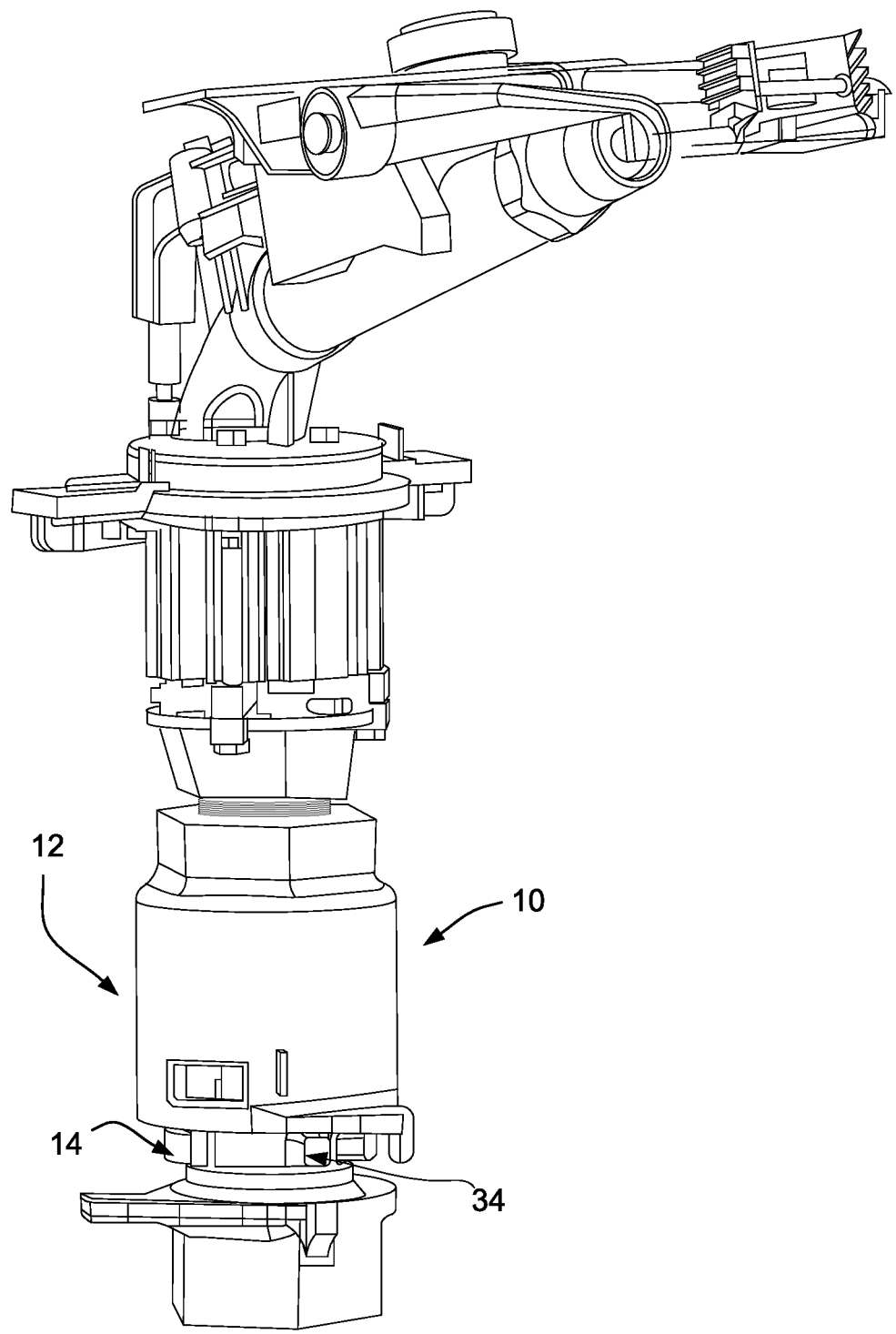
FIGS. 7-10 show a sequence for connecting the coupler.

With reference to FIGS. 1-5, an exemplary coupler 10 according to the described embodiments includes a female connector 12 having a central bore. A male connector 14 defines a post insertable into the central bore. In FIG. 1, the female connector 12 is threadedly connected to a sprinkler SP. The exemplary sprinkler SP shown in FIGS. 1 and 7 is the "BIG GUN®" sprinkler manufactured by Nelson Irrigation Corporation of Walla Walla, Washington. The coupler 10 of the described embodiments is equally applicable to other sprinkler types and is similarly equally applicable to non-sprinkler applications.

Figure 6:
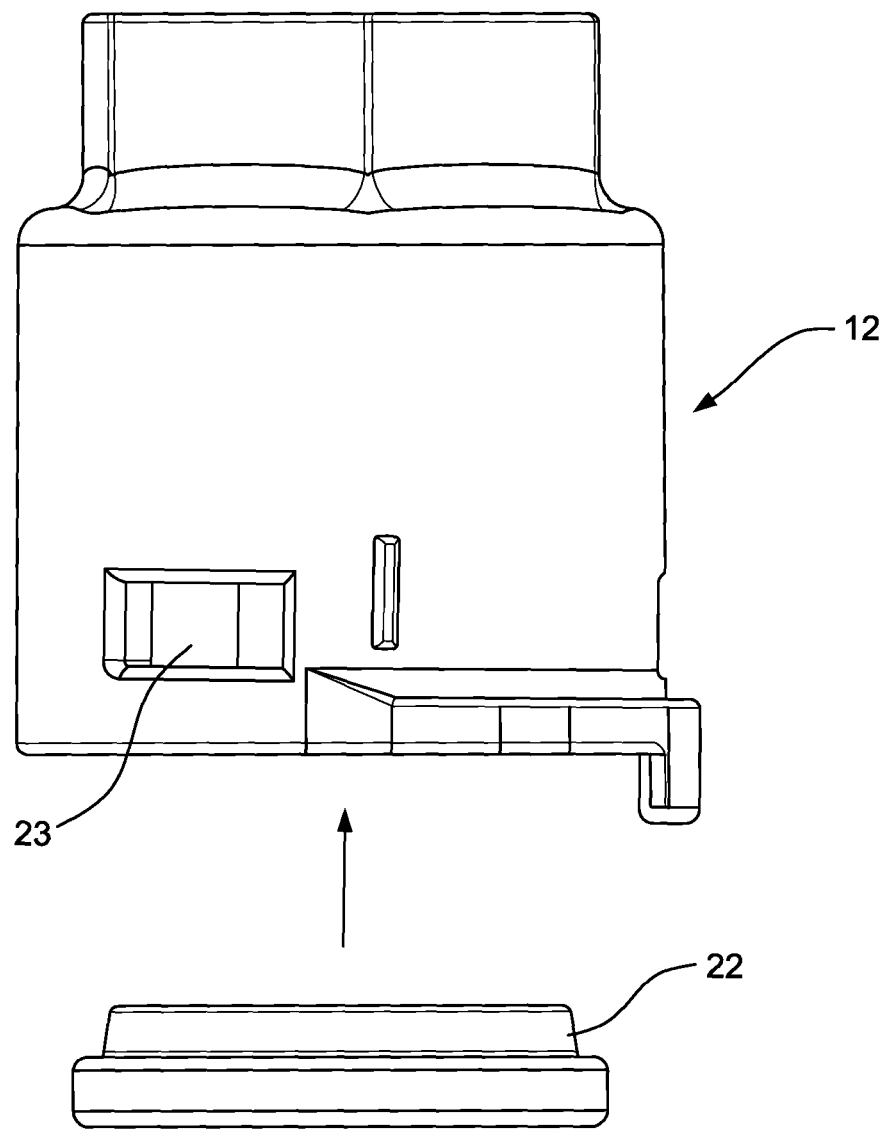
FIG. 6 shows the female connector and an exemplary seal.

The female connector 12 includes a plurality of recesses 16 in an interior flange 18 at a bottom end of the female connector 12. (See FIGS. 2 and 3.) The recesses 16 are formed in different sizes (at least three different sizes shown in FIGS. 2 and 3). The female connector 12 also includes a seal groove 20 for securing a seal 22 (FIG. 6) that acts between the female connector 12 and the male connector 14. A vent 23 is provided in a side wall of the female connector 12. A pin tab 24 includes an aperture 26 therein and a stop arm 28.

The male connector 14 includes a first tab row 30 with a plurality of first tabs 32 and a second tab row 34 with a plurality of second tabs 36. The second tab row 34 and the plurality of second tabs 36 are axially spaced from the first tab row 30 and the plurality of first tabs 32. The first and second tabs 32, 36 are shaped corresponding to the recesses 16 in the female connector 12. The first and second tab rows 30, 34 are circumferentially offset (i.e., not vertically aligned). As discussed in more detail below, this offset effects a multi-step connection between the female connector 12 and the male connector 14.

Figure 4:
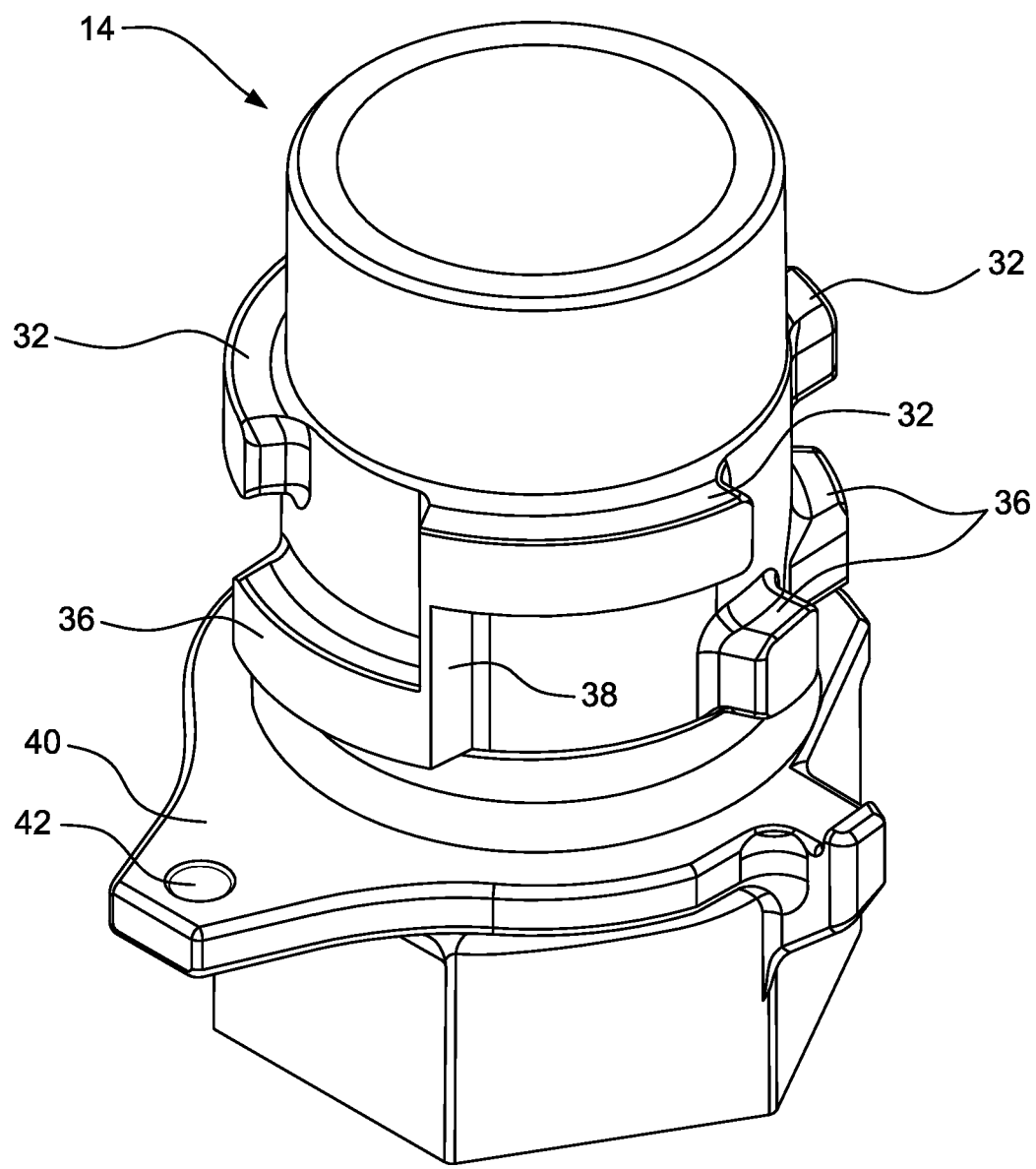
FIG. 4 is a perspective view of the male connector.
Figure 5:
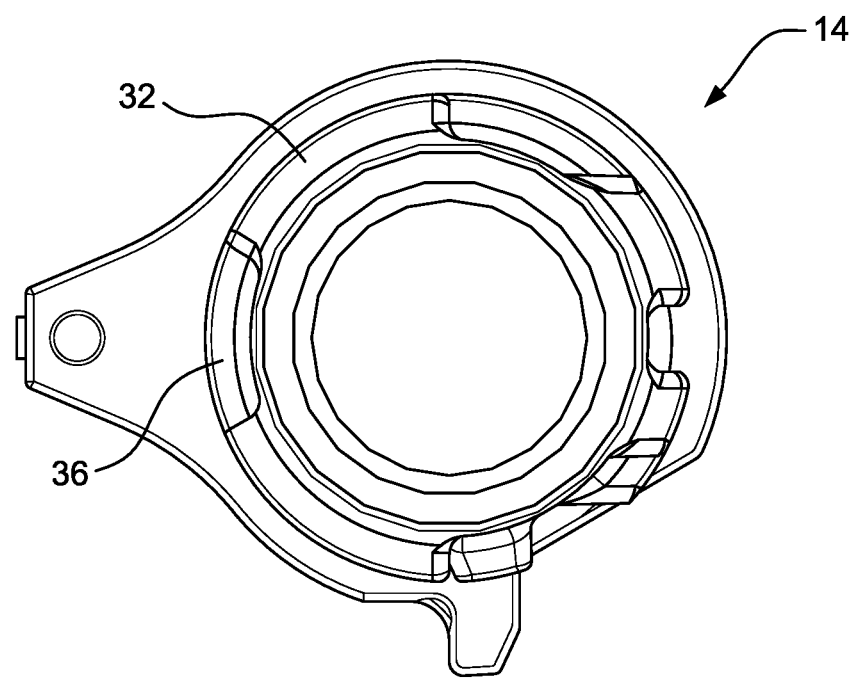
FIG. 5 is a plan view of the male connector.

The male connector 14 also includes a radial stop member 38 connected between the first tab row 30 and the second tab row 34. As shown in FIG. 4, the radial stop member 38 extends vertically between one of the first tabs 32 in the first tab row and one of the second tabs 36 in the second tab row 34. In securing the female connector 12 to the male connector 14, one of the plurality of recesses 16 in the female connector 12 engages the radial stop member 38 when the plurality of recesses 16 are aligned with the second tab row 34.

The male connector 14 includes a pin tab 40 with an aperture 42 therein. The stop arm 28 attached to the pin tab 24 of the female connector 12 may alternatively be secured to the pin tab 40 of the male connector 14.

Figure 8:
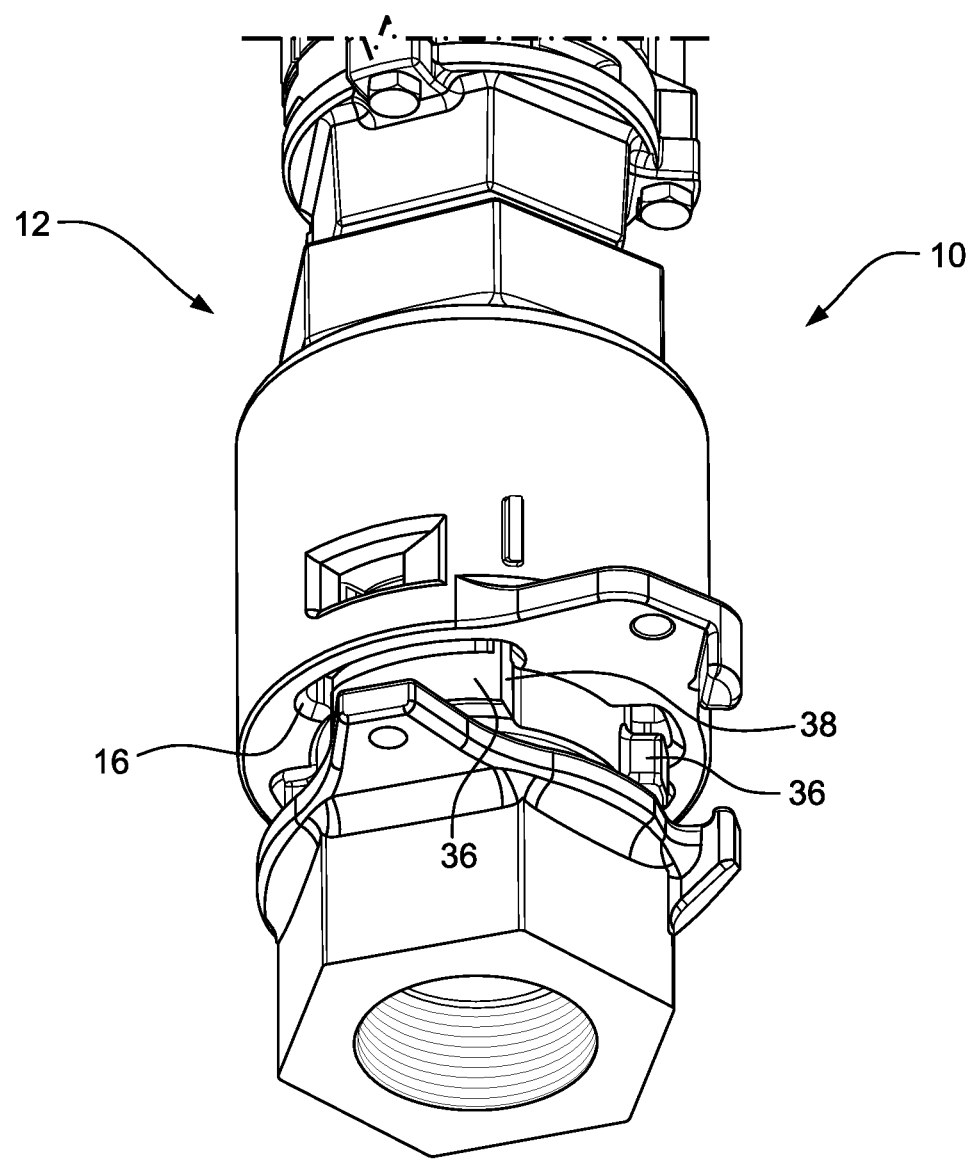
Figure 9:
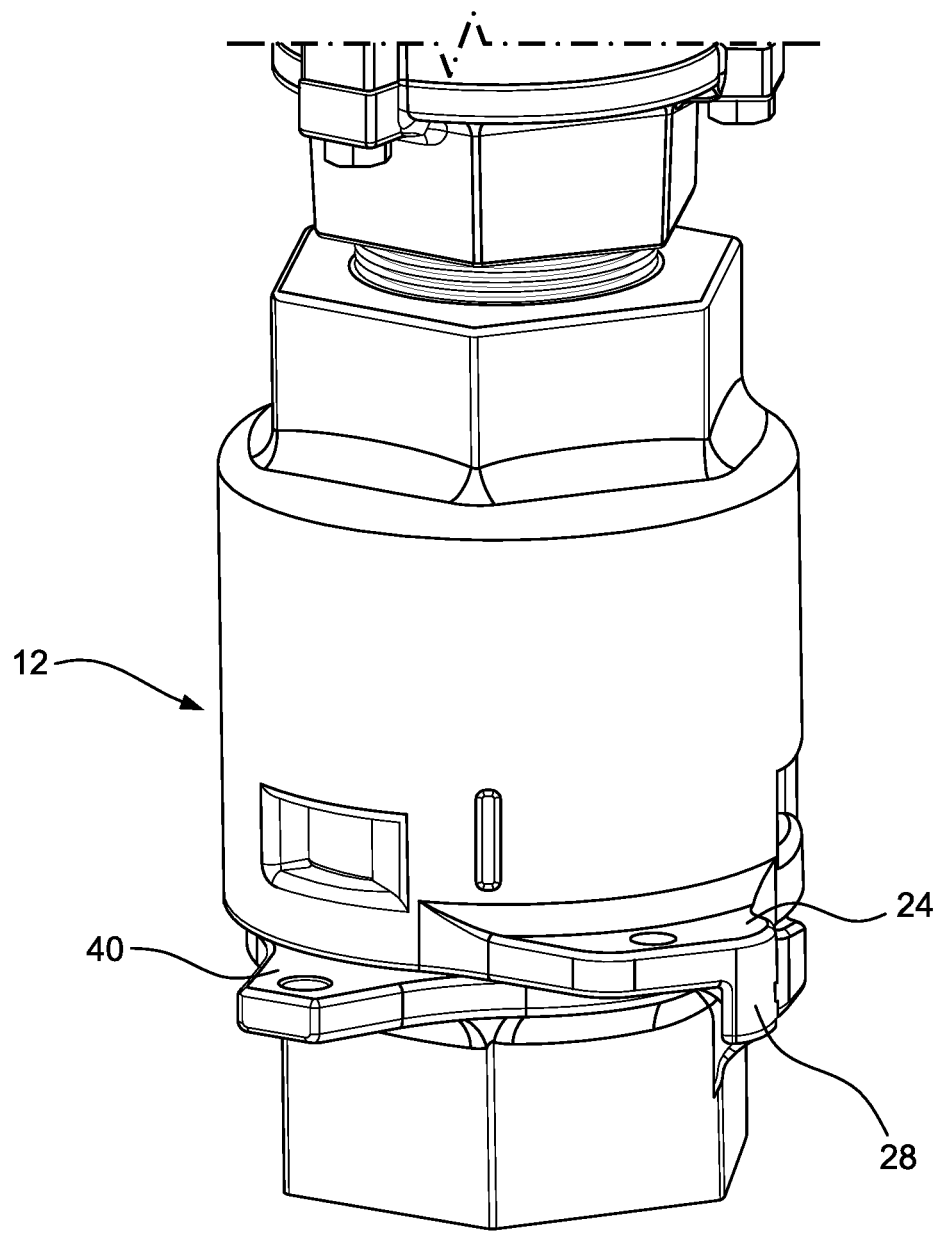
Figure 10:
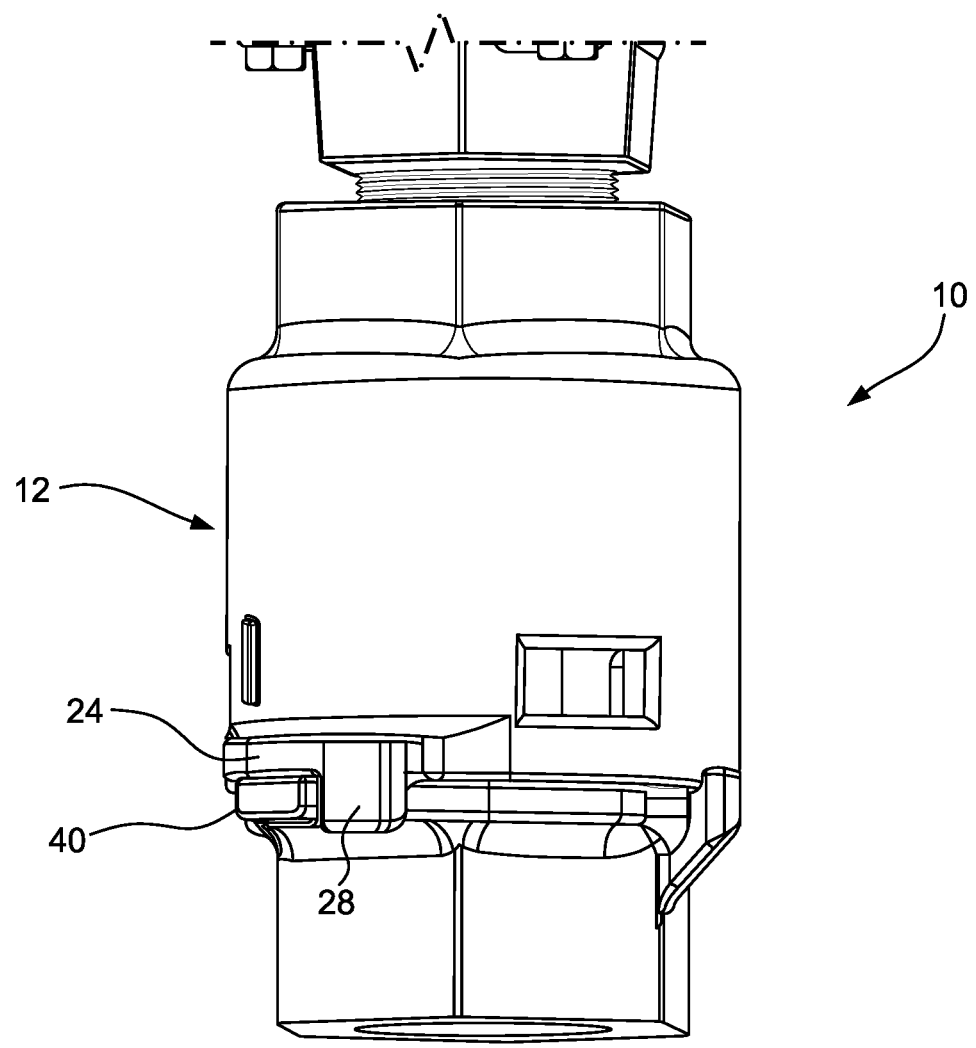

To secure the female connector 12 to the male connector 14, with reference to FIGS. 1 and 7-10, the recesses 16 in the female connector 12 are aligned with the tabs 32 in the first tab row 30 of the male connector 14. Since the tabs 32 and recesses 16 are correspondingly sized and aligned, the recesses 16 pass over the plurality of first tabs 32 of the first tab row 30, and the female connector engages the second tab row 34. (See FIG. 7.) The female connector 12 is then rotated relative to the male connector 14 to align the plurality of recesses 16 with the plurality of second tabs 36 in the second tab row 34. As shown in FIG. 8, one of the plurality of recesses 16 engages the radial stop member 38 when the plurality of recesses 16 are aligned with the second tab row 34 after rotating the female connector 12 relative to the male connector 14. With the recesses 16 aligned with the second tab row 34, the recesses are displaced over the plurality of second tabs 36 in the second tab row 34. (See FIG. 9.) Subsequently, the female connector 12 is rotated relative to the male connector 14 until the female connector 12 is fully seated on the male connector 14. With reference to FIG. 10, the female connector 12 is rotated until the stop arm 28 engages the pin tab 40. In the fully seated position, the apertures 26, 42 in the pin tabs 24, 40 are aligned to receive a lock pin or the like.

The seal groove 20 in the female connector 12 supports the seal 22 adjacent an uppermost portion of the female connector 12. As such, the seal 22 does not fully engage the male connector 14 until the female connector 12 is fully seated on the male connector 14. As a consequence, in operation, in the event that the female connector 12 is inadvertently displaced out of the fully seated position, water pressure will deflect the female connector 12 upwardly until the flange 18 engages the tabs 32 in the first tab row 30. In this position, the seal 22 is not active, and the coupler 10 will vent water through the vents 23 in the female connector 12.

The multi-step connection of the coupler according to the described embodiments provides a secure connection incorporating a safety feature upon inadvertent release to retain the sprinkler from being launched into the air and potentially injuring the irrigator. In the event of an inadvertent disconnection, the seal is displaced from the male connector, and the coupler will vent water to provide a clear indication to the irrigator that the coupler needs attention.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A coupler comprising:
   a female connector having a central bore and a plurality of recesses; and
   a male connector having a post insertable into the central bore, the male connector including a first tab row including a plurality of first tabs and a second tab row including a plurality of second tabs axially spaced from the plurality of first tabs, wherein the first and second tabs are shaped corresponding to the recesses in the female connector,
   wherein the first and second tab rows are circumferentially offset to effect a two-step connection between the female connector and the male connector, and wherein the female connector and the male connector are rotatable relative to each other in each step of the two-step connection to align the plurality of recesses with the plurality of first tabs in a first step of the two-step connection and to align the plurality of recesses with the second tabs in a second step of the two-step connection.

2. A coupler according to claim 1, wherein the plurality of recesses are differently sized, and wherein the pluralities of first and second tabs are correspondingly differently sized.

3. A coupler according to claim 1, wherein the plurality of recesses are differently sized, and wherein the pluralities of first and second tabs are correspondingly differently sized such that the female connector is engageable with the male connector in only one orientation.

4. A coupler according to claim 1, further comprising a seal positioned between the female connector and the male connector, wherein the seal is active when the plurality of recesses are displaced past the second tab row and the female connector is fully seated on the male connector.

5. A coupler according to claim 4, wherein the female connector comprises a seal groove, and wherein the seal is secured in the seal groove.

6. A coupler according to claim 1, wherein the female connector comprises a first pin tab, and wherein the male connector comprises a second pin tab, one of the first and second pin tabs including a stop arm, wherein when the plurality of recesses are displaced past the second tab row, the female connector is rotatable on the male connector until the stop arm engages the other of the first and second pin tabs.

7. A coupler according to claim 6, wherein the first and second pin tabs each comprise an aperture therein, and wherein the apertures are aligned when the stop arm engages the other of the first and second pin tabs.

8. A coupler according to claim 1, wherein the female connector is rotatable relative to the male connector to align the plurality of recesses with the pluralities of first and second tabs such that female connector is connectable to the male connector in a four-step process including: (1) positioning the plurality of recesses over the plurality of first tabs in the first tab row, (2) rotating the female connector relative to the male connector to align the plurality of recesses with the plurality of second tabs in the second tab row, (3) positioning the plurality of recesses over the plurality of second tabs in the second tab row, and (4) rotating the female connector relative to the male connector until the female connector is fully seated on the male connector.

9. A sprinkler assembly comprising:
a sprinkler; and
the coupler according to claim 1,
wherein the female connector is secured to the sprinkler, and wherein the male connector is secured to a source of water under pressure.

10. A coupler comprising:
a female connector having a central bore and a plurality of recesses; and
a male connector having a post insertable into the central bore, the male connector including a first tab row including a plurality of first tabs and a second tab row including a plurality of second tabs axially spaced from the plurality of first tabs, wherein the first and second tabs are shaped corresponding to the recesses in the female connector,
wherein the first and second tab rows are circumferentially offset to effect a two-step connection between the female connector and the male connector,
the coupler further comprising a radial stop member connected between the first tab row and the second tab row, wherein one of the plurality of recesses engages the radial stop member when the plurality of recesses are aligned with the second tab row.

11. A coupler comprising:
a female connector having a central bore and a plurality of recesses, at least two of the plurality of recesses being differently sized;
a male connector having a post insertable into the central bore, the male connector including a first tab row including a plurality of first tabs and a second tab row including a plurality of second tabs axially spaced from the plurality of first tabs, wherein the first and second tabs are shaped corresponding to the recesses in the female connector; and
a radial stop member connected between the first tab row and the second tab row, wherein one of the plurality of recesses engages the radial stop member when the plurality of recesses are aligned with the second tab row.

12. A coupler according to claim 11, wherein the first and second tab rows are circumferentially offset to effect a two-step connection between the female connector and the male connector.

13. A coupler according to claim 12, further comprising a seal positioned between the female connector and the male connector, wherein the seal is active when the plurality of recesses are displaced past the second tab row and the female connector is fully seated on the male connector.

14. A coupler according to claim 13, wherein the seal is inactive until the female connector is fully seated on the male connector.

15. A coupler according to claim 13, wherein the female connector comprises a seal groove, and wherein the seal is secured in the seal groove.

16. A coupler according to claim 11, wherein the female connector comprises a first pin tab, and wherein the male connector comprises a second pin tab, one of the first and second pin tabs including a stop arm.

17. A coupler according to claim 16, wherein the first and second pin tabs each comprise an aperture therein.

* * * * *